(12) United States Patent
Holt et al.

(10) Patent No.: US 10,822,801 B2
(45) Date of Patent: Nov. 3, 2020

(54) APPARATUS AND METHODS FOR A NONINVASIVE ROOF ATTACHMENT SYSTEM WITH VERTICAL MEMBERS

(71) Applicant: ARAYSTAYS CORPORATION, Indian Head, MD (US)

(72) Inventors: John Granville Holt, Annapolis, MD (US); Mark Anthony Holt, Indian Head, MD (US)

(73) Assignee: ARAYSTAYS CORPORATION, Indian Head, MD (US)

( * ) Notice: Subject to any disclaimer, the term of this patent is extended or adjusted under 35 U.S.C. 154(b) by 0 days.

(21) Appl. No.: 16/725,835

(22) Filed: Dec. 23, 2019

(65) Prior Publication Data

US 2020/0131776 A1 Apr. 30, 2020

Related U.S. Application Data

(63) Continuation of application No. 16/428,012, filed on May 31, 2019, which is a continuation of application
(Continued)

(51) Int. Cl.
*F24S 25/65* (2018.01)
*F24S 25/613* (2018.01)
(Continued)

(52) U.S. Cl.
CPC ............... *E04D 13/00* (2013.01); *E04D 1/30* (2013.01); *F24S 25/00* (2018.05); *F24S 25/30* (2018.05);
(Continued)

(58) Field of Classification Search
CPC .............. H02S 20/23; F24S 2025/6009; F24S 2025/6004; F24S 25/65; F24S 25/613
See application file for complete search history.

(56) References Cited

U.S. PATENT DOCUMENTS

| 4,126,971 A | 11/1978 | Macuga et al. |
| 4,905,131 A | 2/1990 | Gary |

(Continued)

FOREIGN PATENT DOCUMENTS

| DE | 102005059487 A1 * | 7/2007 |
| DE | 202009006367 U1 | 9/2010 |

(Continued)

OTHER PUBLICATIONS

Derwent Abstract of CN 207368934 U (Year: 2018).*
(Continued)

*Primary Examiner* — Brian D Mattei
*Assistant Examiner* — Charissa Ahmad
(74) *Attorney, Agent, or Firm* — Rogers Towers, P.A.; Joseph P. Kincart

(57) ABSTRACT

A non-slip roof attachment system for attaching structures to residential and commercial roofs without the use of penetrations to roofing shingles and sealing layers is described. The non-slip attachment system may be used to attach roof mounted systems such as solar panels. The non-slip attachment system also allows for the quick removal of such roof mounted systems rapidly and without the need for repair of penetrations. The non-slip attachment system uses, among other things, an array-stay retainer comprising a vertical member and a horizontal member. A high friction foam polymer padding is used to further secure the non-slip attachment system to the roof.

18 Claims, 7 Drawing Sheets

Related U.S. Application Data

No. 16/174,645, filed on Oct. 30, 2018, now Pat. No. 10,640,981, which is a continuation of application No. 15/394,487, filed on Dec. 29, 2016, now Pat. No. 10,145,116.

(60) Provisional application No. 62/387,326, filed on Dec. 29, 2015, provisional application No. 62/387,325, filed on Dec. 29, 2015.

(51) Int. Cl.

| | | |
|---|---|---|
| *F24S 25/61* | (2018.01) | |
| *E04D 13/00* | (2006.01) | |
| *H02S 20/23* | (2014.01) | |
| *F24S 25/30* | (2018.01) | |
| *F24S 25/00* | (2018.01) | |
| *F24S 25/60* | (2018.01) | |
| *F24S 25/40* | (2018.01) | |
| *E04D 1/30* | (2006.01) | |
| *F21V 21/00* | (2006.01) | |
| *F21W 131/107* | (2006.01) | |
| *F24S 25/67* | (2018.01) | |

(52) U.S. Cl.
CPC ............... *F24S 25/40* (2018.05); *F24S 25/60* (2018.05); *F24S 25/61* (2018.05); *F24S 25/613* (2018.05); *F24S 25/65* (2018.05); *H02S 20/23* (2014.12); *F21V 21/00* (2013.01); *F21W 2131/107* (2013.01); *F24S 25/67* (2018.05); *F24S 2025/014* (2018.05); *F24S 2025/016* (2018.05); *F24S 2025/02* (2018.05); *F24S 2025/021* (2018.05); *F24S 2025/601* (2018.05); *F24S 2025/6004* (2018.05); *F24S 2025/6006* (2018.05); *F24S 2025/6009* (2018.05); *Y02B 10/12* (2013.01); *Y02B 10/20* (2013.01); *Y02E 10/47* (2013.01)

(56) References Cited

U.S. PATENT DOCUMENTS

| | | |
|---|---|---|
| 5,067,061 A | 11/1991 | Prickett |
| 5,496,005 A | 3/1996 | Dieringer |
| 5,513,081 A | 4/1996 | Byers |
| 5,707,136 A | 1/1998 | Byers |
| 6,076,938 A | 6/2000 | Kinderman |
| 6,111,189 A * | 8/2000 | Garvison .......... H01L 31/02008 |
| | | 136/244 |
| 6,405,494 B1 | 6/2002 | Wismeth |
| 6,786,012 B2 * | 9/2004 | Bradley, Jr. .............. H02S 20/23 |
| | | 52/173.3 |
| 7,435,134 B2 | 10/2008 | Lenox |
| 7,506,477 B2 | 3/2009 | Flaherty et al. |
| 7,745,722 B2 * | 6/2010 | Warfield .................. H02S 20/23 |
| | | 136/244 |
| 7,762,027 B1 | 7/2010 | Wentworth et al. |
| 7,814,899 B1 | 10/2010 | Port |
| 7,862,202 B2 | 1/2011 | Laso et al. |
| 8,122,648 B1 | 2/2012 | Liu |
| 8,156,697 B2 | 4/2012 | Miros et al. |
| 8,272,174 B2 | 9/2012 | Stearns et al. |
| 8,631,629 B1 | 1/2014 | Wiener |
| 8,677,702 B2 | 3/2014 | Jenkins |
| 8,713,858 B1 | 5/2014 | Xie |
| 8,752,338 B2 | 6/2014 | Schaefer et al. |
| 8,752,343 B2 | 6/2014 | Kuan et al. |
| 8,782,983 B2 | 7/2014 | Stearns |
| 8,806,815 B1 | 8/2014 | Liu et al. |
| 8,826,618 B2 | 9/2014 | Stearns |
| 8,839,575 B1 | 9/2014 | Liu et al. |
| 9,080,792 B2 | 7/2015 | Patton et al. |
| 9,806,668 B2 | 10/2017 | Johansen et al. |
| 10,033,328 B2 | 7/2018 | Wildes et al. |
| 10,151,114 B2 | 12/2018 | Stearns et al. |
| 10,472,828 B2 | 11/2019 | Stearns et al. |
| 2002/0066235 A1 | 6/2002 | Stearns et al. |
| 2003/0070368 A1 | 4/2003 | Shingleton |
| 2004/0163338 A1 | 8/2004 | Liebendorfer |
| 2005/0166383 A1 * | 8/2005 | Newberry ............... E04D 13/10 |
| | | 29/428 |
| 2007/0111581 A1 | 5/2007 | Ressler |
| 2008/0087275 A1 | 4/2008 | Sade et al. |
| 2008/0128462 A1 | 6/2008 | Harberts et al. |
| 2009/0044854 A1 | 2/2009 | Placer et al. |
| 2009/0078299 A1 | 3/2009 | Cinnamon et al. |
| 2009/0242014 A1 | 10/2009 | Leary |
| 2010/0192505 A1 | 8/2010 | Schaefer et al. |
| 2010/0242381 A1 | 9/2010 | Jenkins |
| 2010/0243023 A1 | 9/2010 | Patton et al. |
| 2010/0275549 A1 * | 11/2010 | Bruce ................... F24S 25/636 |
| | | 52/698 |
| 2011/0067339 A1 | 3/2011 | Hall |
| 2011/0067693 A1 * | 3/2011 | Paull ....................... F24S 25/30 |
| | | 126/704 |
| 2011/0154774 A1 | 6/2011 | Rawlings |
| 2011/0179727 A1 | 7/2011 | Liu |
| 2011/0203637 A1 | 8/2011 | Patton et al. |
| 2011/0204195 A1 | 8/2011 | Stanley |
| 2011/0302857 A1 | 12/2011 | McClellan et al. |
| 2011/0303807 A1 | 12/2011 | Walraven |
| 2011/0314751 A1 | 12/2011 | Jette |
| 2012/0061337 A1 | 3/2012 | Seery et al. |
| 2013/0032208 A1 | 2/2013 | Walz et al. |
| 2013/0192150 A1 | 8/2013 | DuPont et al. |
| 2013/0291472 A1 | 11/2013 | Sader |
| 2013/0298494 A1 | 11/2013 | Corsi |
| 2013/0299655 A1 | 11/2013 | Sader |
| 2015/0014496 A1 | 1/2015 | Roensch et al. |
| 2015/0040969 A1 | 2/2015 | Wildes |
| 2015/0171786 A1 | 6/2015 | Worden |
| 2015/0330431 A1 | 11/2015 | McKenna |
| 2016/0087576 A1 | 3/2016 | Johansen et al. |
| 2016/0177583 A1 | 6/2016 | Kurtz |
| 2016/0248367 A1 | 8/2016 | Almy et al. |
| 2018/0167020 A1 | 6/2018 | Truthseeker |
| 2018/0209693 A1 | 7/2018 | Parkinson et al. |
| 2018/0241341 A1 | 8/2018 | Needham et al. |
| 2018/0323742 A1 | 11/2018 | Dick et al. |
| 2019/0363669 A1 | 11/2019 | Wildman et al. |

FOREIGN PATENT DOCUMENTS

| | | | |
|---|---|---|---|
| DK | 201170262 A | 11/2012 | |
| EP | 767276 B1 | 8/1999 | |
| FR | 3032737 A1 | 8/2016 | |
| GB | 2423786 A | 9/2006 | |
| JO | 2006137589 A | 6/2006 | |
| JP | 59217450 A | 12/1984 | |
| JP | 60120149 A * | 6/1985 | ............ F24S 25/613 |
| JP | 1068196 A | 3/1998 | |
| JP | 10068196 A | 3/1998 | |
| JP | 10068196 A * | 3/1998 | ............ F24S 25/613 |
| JP | 10122125 A | 5/1998 | |
| JP | 10183898 A | 7/1998 | |
| JP | 10245952 A * | 9/1998 | ............ F24S 25/613 |
| JP | 10245952 A | 9/1998 | |
| JP | 10317592 A | 12/1998 | |
| JP | 10317622 A | 12/1998 | |
| JP | 11324259 A * | 11/1999 | ............ F24S 25/33 |
| JP | 2014240540 A | 12/2014 | |
| JP | 2017036578 A | 2/2017 | |
| WO | 2010123929 A1 | 10/2010 | |
| WO | 2015110254 A1 | 7/2015 | |

OTHER PUBLICATIONS

Derwent Abstract for CN 201817986 U (year:2011).
Derwent Abstract for CN 207368934 U (year:2018).
Derwent Abstract for CN 207518531 U (Year:2018).

(56) References Cited

OTHER PUBLICATIONS

Derwent Abstract for WO 2015016987 A1 (Year: 2015).

* cited by examiner 270 pre drilled
280 pre drilled

APPARATUS AND METHODS FOR A NONINVASIVE ROOF ATTACHMENT SYSTEM WITH VERTICAL MEMBERS

The present application claims priority to Non-Provisional patent application Ser. No. 16/428,012 filed May 31, 2019 and entitled APPARATUS AND METHODS FOR A NONINVASIVE ROOF ATTACHMENT SYSTEM WITH VERTICAL MEMBERS as a Continuation Application; which in turn claims priority to Non-Provisional patent application Ser. No. 16/174,645, filed Oct. 30, 2018 and entitled APPARATUS AND METHODS FOR SECURE, NON-INVASIVE AND NON-PERMANENT SURFACE ATTACHMENT SYSTEMS as a Continuation Application; which in turn claims priority to Non-Provisional patent application Ser. No. 15/394,487, filed Dec. 29, 2016 and entitled APPARATUS AND METHODS FOR SECURE, NON-INVASIVE AND NON-PERMANENT SURFACE ATTACHMENT SYSTEMS now U.S. Pat. No. 10,145,116 issued Dec. 4, 2018, as a Continuation Application; which in turns claims priority to Provisional Patent Application Ser. No. 62/387,325, filed Dec. 29, 2015 and entitled APPARATUS FOR ATTACHING EQUIPMENT TO ROOFS AND METHOD OF MANUFACTURING SAME; and to Provisional Patent Application Ser. No. 62/387,326 filed Dec. 29, 2015 and entitled WEIGHT DISPERSION ANTI-LIFT SPACE FRAME BALLAST WITH HEAT SINK AND CIRCULATING COOLING ABILITY ATTACHED WITH NO HOLES IN ROOF DECKING; the contents of each of which are relied upon and incorporated herein by reference.

FIELD OF THE INVENTION

The present invention relates generally to a surface mounted attachment system and more specifically it relates to a roof mounted attachment system for devices to a roof without a need to penetrate roof shingles and underlying sealing layers or membranes.

BACKGROUND OF THE INVENTION

Increasingly, commercial and residential structures are being outfitted with roof based structures such as solar photovoltaic or thermal installations which require fastening and support systems to securely hold the roof based structure in place. In many cases these installations are being utilized by homeowners and businesses in an effort to reduce energy costs. Typically, such structures may be secured to a roof using devices such as an L-foot attachment, wherein the horizontal portion of the L-foot is secured to structural elements on the roof and the vertical portion is secured to the structure being attached, such as solar panels or solar water collectors.

The methods used to install L-foot type attachments generally necessitates penetration of the roof with a roof fastener such as a screw in order to secure the L-foot attachment to the roof. In the past, various methods have been utilized to seal such a penetration to prevent water leakage into the roof. Such methods have included utilizing roofing sealant and flashing over the L-foot attachment. However, sealing penetration with roofing sealant may deteriorate over time and/or crack. Utilizing flashing often requires that the flash itself be nailed to the roof, which again creates new roof penetrations and potential water leakage points. It would be desirable to have roof attachment systems which do not include portions which create penetrations.

In a similar vein, the economic model for many of the roofing installations of structures used to generate energy have involved ownership of the structures by a third party. In cases where it is necessary for the third part to remove a structure, the process may be very involved when the support structures have utilized components which penetrate the roof. It may be expensive and time consuming to remove such an energy generating structure once it has been installed. Hereto, it would be desirable to have systems that do not need to have penetrations repaired and may be rapidly uninstalled.

Because of these inherent problems with the current related art, there is a need for a new and improved roof attachment system that does not create penetrations to a roofing system.

SUMMARY OF THE INVENTION

Accordingly, methods and apparatus to attach roof structures without penetrations are disclosed. Apparatus to be attached to roof structures may include, by way of non-limiting example a solar panel, a dish antenna, signage, water diversion members or other apparatus.

In some examples, a non-slip retainer attachment system for roofing structures may be formed comprising roof shingles on a roof, wherein the roof shingles are arranged in a pattern with a seam between adjacent shingles, wherein the seam repeats in a vertical pattern from a base of the roof to the crest. The non-slip retainer attachment system may also comprise a device called an array stay, wherein the array stay includes a vertical member that protrudes through the seam between adjacent shingles and a lateral member that lies underneath one or both of the adjacent shingles and may be used as one of a plurality of array stay members. The non-slip retainer attachment system may also comprise a first hole in the vertical member of the array stay. The attachment system may also include a first beam, wherein the first beam includes a second hole, wherein a fastening component penetrates the first hole in the vertical member and the second hole thereby attaching the first beam to the array stay.

In some examples, the non-slip retainer attachment system may include examples where the lateral member of the array stay is in the form of a straight bar. In other examples, the non-slip retainer attachment system may include examples wherein the lateral member of the array stay is in the form of a spiral.

The non-slip retainer attachment system may also include high friction polymer foam padding, wherein the high friction polymer foam padding is positioned between the first beam and the roof.

In some examples, a non-slip retainer attachment system may also comprise a second beam, wherein the second beam is positioned next to the first beam, wherein the first beam and the second beam lie on distal sides of the of the vertical member of the array stay. In some of these examples, a non-slip retainer attachment system may also include examples where the first beam and the second beam include a vertical component and a lateral component, wherein the first beam and the second include pre-drilled holes, wherein the holes on the vertical component of the first beam and the second beam are aligned.

In some examples, a non-slip retainer attachment system may further include a conventional solar panel slotted-rail attachment clips. The attachment system may also include a first solar panel. In some examples, the attachment system with an attached first solar panel may also include soffit under-mount hardware. The soffit under-mount hardware may also include one or more of a security camera, a motion detector, an external lighting system, and an external speaker system, attached to the soffit under-mount hardware.

Implementations may include a method of reversibly attaching items to a roofing system. The method may comprise placing a first array-stay retainer attachment upon a roof, wherein a lateral member of the first array-stay retainer attachment is positioned underneath at least a first roofing shingle and a vertical member of the first array-stay retainer attachment protrudes through a seam between the first roofing shingle and a second roofing shingle, and wherein the seam lies between an edge of the first roofing shingle and an edge of the second roofing shingle. The method may also include placing a second array-stay retainer attachment upon a roof, wherein a lateral member of the second array-stay retainer attachment is positioned underneath at least a third roofing shingle and a vertical member of the second array-stay retainer attachment protrudes through a seam between the third roofing shingle and a fourth roofing shingle, and wherein the seam lies between an edge of the third roofing shingle and an edge of the fourth roofing shingle. The method may also include placing a first half split-beam upon the roof, wherein the first half split-beam has pre-drilled holes, and wherein the first half split-beam pre-drilled holes align with a hole in the first array stay retainer attachment and with a hole in the second array stay retainer attachment. The method may also include placing a fastener into the hole in the first array stay retainer attachment and through a hole in the first half split-beam. The method may also include attaching a slotted-rail attachment clip to at least the first half split-beam. The method may also include attaching a support member to the slotted rail attachment clip.

In some examples, the method may include examples where the lateral member of the array stay is in the form of a straight bar. In some examples, the method may include examples where the lateral member of the array stay is in the form of a spiral.

In some examples, the method may include examples which also include attaching a solar panel to the support member. In some examples, the method may include examples which also include removing the solar panel and removing the first array stay retainer attachment. In these examples, the roof under the first array stay does not have any penetrations exposed after the removing of the first array stay retainer attachment. In some of these examples the method further includes routing an electrical wire through a conduit from the solar panel along the support member. In some of these examples the method further includes attaching a soffit under-mount hardware assembly to at least the first half split beam, and attaching one or more of a security camera, a motion detector, an external lighting system, and an external speaker system, attached to the soffit under-mount hardware.

BRIEF DESCRIPTION OF THE DRAWINGS

The accompanying drawings, that are incorporated in and constitute a part of this specification, illustrate several examples of the invention and, together with the description, serve to explain the principles of the invention.

DETAILED DESCRIPTION OF PREFERRED EXAMPLES

The present invention provides apparatus, devices and methods to removably attach equipment to tiled surfaces, such as a roof top without the need to penetrate the surface of the roof and thereby compromise the integrity of the roof. Items to be attached may include, for example, a solar panel, a dish antenna, a landing pad for a drone, signage, water diversion members or other apparatus. In some embodiments, the removable attachment provides for the attachment of equipment in a manner that does not result in the equipment becoming a permanent part of the structure to which the equipment is attached.

Figure 1:
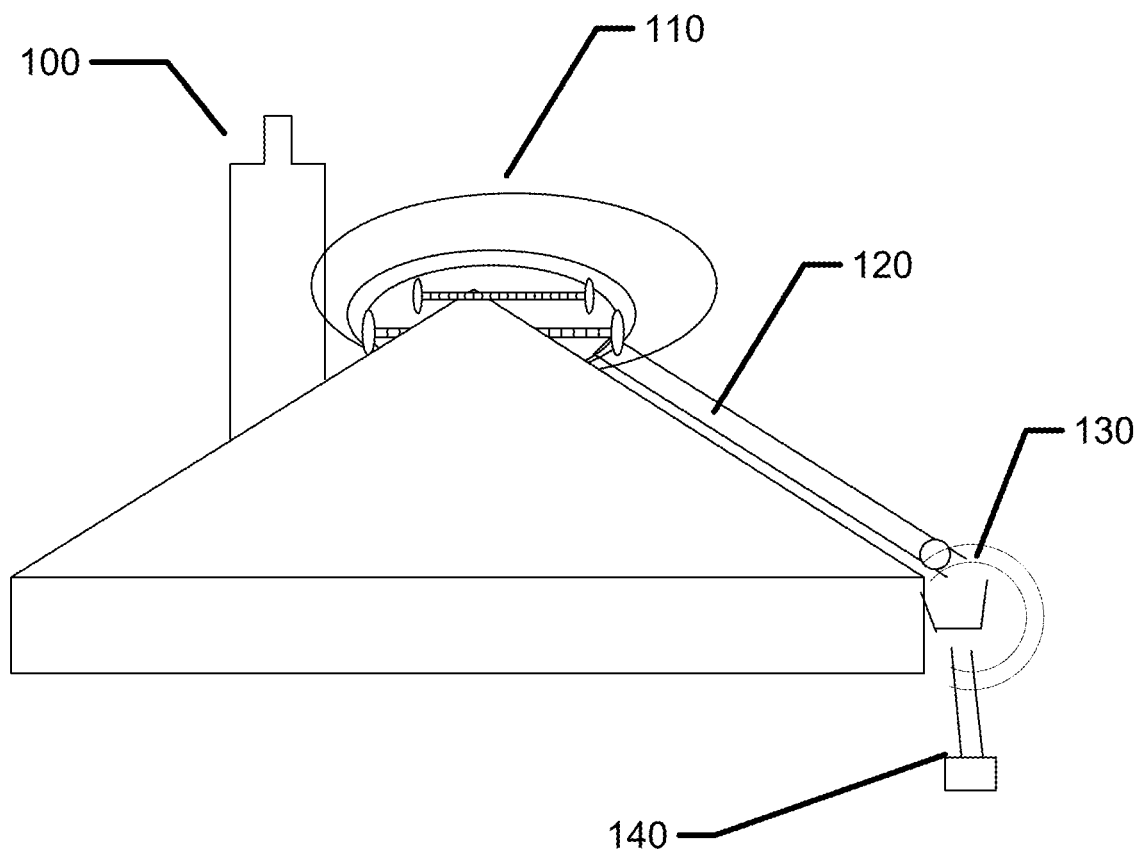
FIG. 1 illustrates an exemplary view of a roof rack system according to some implementations of the present invention.

Referring to FIG. 1, a system of a roof rack system based on non-slip retainer attachments according some implementations of the present invention is illustrated. In some examples a roof rack system 100 may include a roof peak cover 110, to protect from elements such as dust and ice. The system may also include a roof racking system 120. In some examples of the present invention, the roof racking system may provide an easily removable, non-penetrating support system for roof mounted systems such as solar array panels. In additional examples, a gutter bridge 130 may connect the roof racking system 120 to stabilizing features that may connect under the soffit of a house.

Support members 140 may connect through a gutter bridge and provide mounting support for various house systems that would otherwise need to be affixed to the house. Some of the components, such as the roof racking system 120 may be installed as standalone structures, but when the structures in FIG. 1 are deployed from a first soffit on one side of the roof over the roof peak and back down the roof to a second soffit self-stabilizing structure may be formed which may have numerous features to adjust and control tension on system elements between various points.

Tiled surfaces may include asphalt roofing tiles, ceramic tiles, ceramic tiles, shake tiles or other types of tiles. It is also understood that although the disclosure is generally written in view of a roof surface, other surfaces may also be used, such as building siding.

Array Stay—Split Beam System

Referring to FIG. 2, an example of an array-stay split-beam system 200 is illustrated. The array stay system 200 as disclosed herein may be used in various implementations in conjunction with, or without, a ballast. In addition, to the array-stay systems 200 depicted in FIG. 2 may be utilized to non-invasively removably affix items upon a roof-top. Items to be affixed to the roof top may include by way of non-limiting example, include, a solar panel, a dish antenna, signage, water diversion members or other apparatus. These systems provide means to support solar panel systems or other roof mounted devices without the need to penetrate existing shingle roofing in the larger field of the roofing area. The fact that the support systems do not penetrate the roof creates further advantages such as easier removability of roof mounted systems and less repair needs required after removal of the array-stay systems.

The array-stay split-beam system may include an asphalt shingle roof anchoring device/method that may allow anchoring to a shingle roof without penetrating the actual roofing. The array stays 210 consist of 90 degree aluminum angles which slip under the sides of shingles. In some examples, the array stays 210 may measure about one and a half inch wide. Again, the array stays may be inserted through the side and under a typical roofing shingle tab. The lateral leg 211 of each 90 degree angle may extend under the shingle tab at least four inches. The vertical leg 212 of the angles may extend approximately two inches. In this example, the array stay angles or clips may be inserted through the sides of two shingle tabs in opposite directions (left and right). The two clips or angles may then be slid until they are in-line back to back 202, with the two vertical legs touching each other, and towards the upper part of the shingles. Combinations of these two juxtaposed array stays are inserted in every other row of shingles in a straight line with the double array-stays about ten inches apart.

A split-beam 220 may consist of two 90 degree aluminum angles 221, 222, with each leg of the angle at least two inches wide in some examples. Once the array-stay clips 202 are in position, the two halves of the split-beam 221, 222 may be placed on either side of the row of array-stay clips 202, clamped together, and screwed together with a stainless steel self-tapping screw 230, fastening the two halves of the split-beam 221, 222 together and to both array-stay clips 202 at the same time at each array-stay 210 location (about ten inches apart). After all of the connections may be made, the effect is that the split-beam 220 may be secured to the shingle roof with multiple connection points to the features residing under the actual shingle roofing. The lateral legs of the split-beam 220 pressing down on top of the shingle adds to the strength of the multiple under-single connections. The split-beam 220 bottoms may have high friction polymer foam padding 223 for adhesion and protection of the surface.

Once the array-stays 210 and split-beam 220 angles are connected, a middle slot may be formed between the split-beam 220 that may allow the insertion of split-beam brackets 240. In an example the split-beam brackets 240 may consist of two inch by two inch aluminum angles (at least one and a half inches long) that may fit into the slot to form connection points for conventional solar panel slotted-rail attachment clips 250. The two split-beam brackets 240 are attached to the split-beam 220 with one stainless steel self-tapping screw 230. The conventional slotted-rail attachment clips may be screwed to the split-beam rail clips 210 using the same screws 230.

Figure 2A:
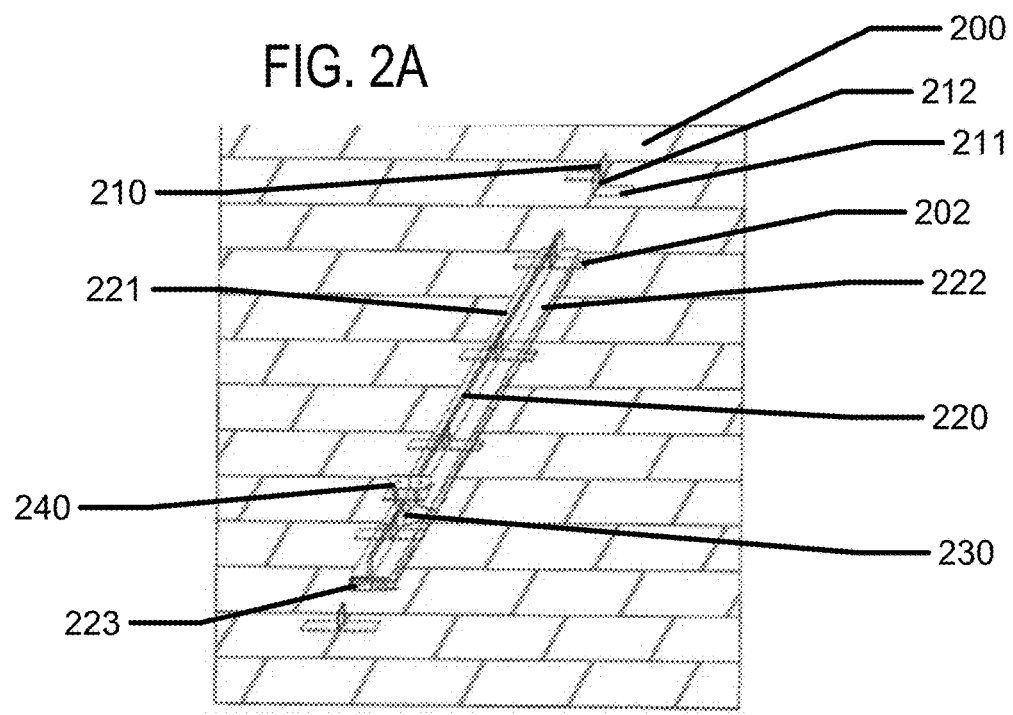
FIGS. 2A-2F illustrate components that may be included in an exemplary array-stay split-beam system with angled array-stays
Figure 2B:
Figure 2D:
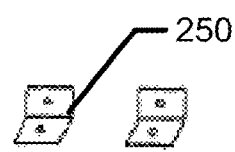
Figure 2C:
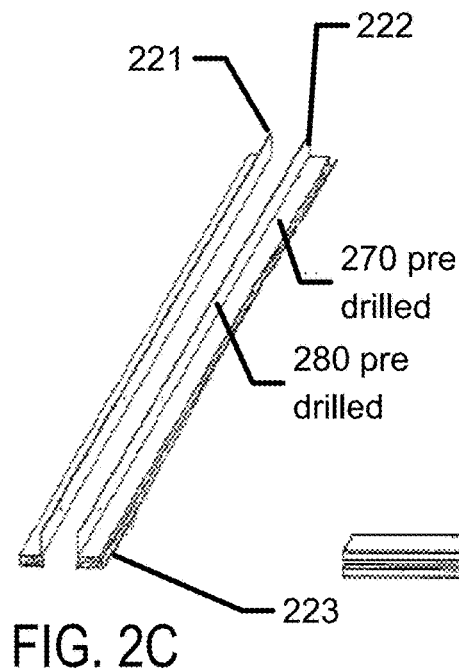
Figure 2E:
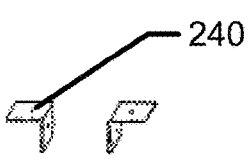
Figure 2F:

There may be numerous components that make up and attach to the array-stay split beam system. Referring to FIG. 2B, array-stays are shown in isolation. As mentioned earlier a typical array stay may include a vertical piece 212 and a lateral piece 201. Referring to FIG. 2C the two sides of the split-beam are illustrated. A first half 221 and a second half 222 are shown separated from each other. An exemplary high friction polymer foam padding 223 for adhesion and protection of the surface is also illustrated. The split beam halves may have pre drilled holes in them for easy use in the field. Exemplary pre drilled holes are illustrated with holes in the lateral piece 270 and with holes in the vertical piece 280. These holes may allow for other components to be screwed into the support system. Referring to FIG. 2D, an example of hardware that may be attached to the pre-drilled holes is illustrated. Conventional solar panel slotted-rail attachment clips 250 are illustrated. Referring to FIG. 2E, another example of hardware that may be attached to the split beam components is illustrated. Split beam brackets 240 may be assembled into the slot between split beam components. Referring to FIG. 2F, an exemplary beam 260 which may support solar panels is illustrated. This beam may be attached to the array-stay support system with the components such as illustrated in FIG. 2E and FIG. 2D in some examples.

In some embodiments, an array of solar power collecting glass shingles may be installed over an existing asphalt tile roof or other type tiling surface. In such embodiments, the solar collecting device may include a glass or quartz tile with a solar collecting surface.

Ballast Array-Stay System

Figure 3A:
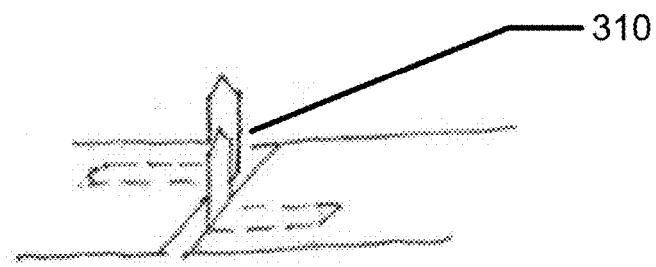
FIGS. 3A-3C illustrate an exemplary array-stay beam system with block form ballast and array-stays.
Figure 3B:
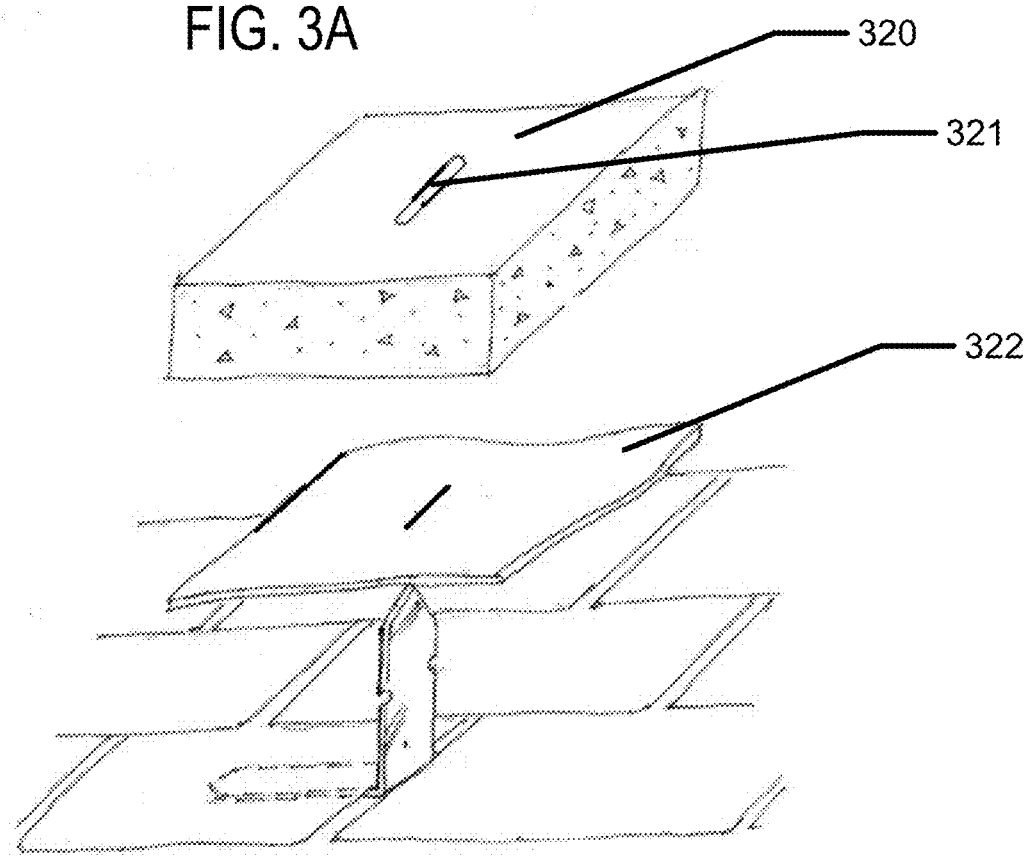
Figure 3C:
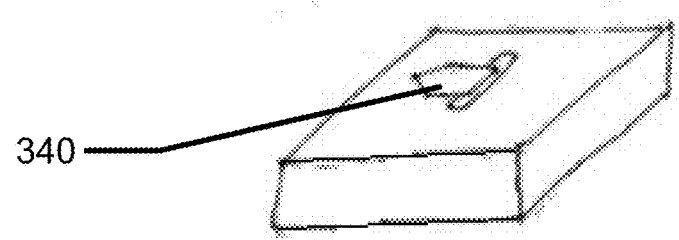

In some examples, the components of an array-stay system may be supplemented with components that may act as ballast weight to add pressure above the array stay anchor locations and to increase the surface area attached to the array-stay system that interacts with the roof system. Referring to FIG. 3A, an exemplary array stay anchor 310 configured to support ballast components is illustrated. The exemplary array stay may be fundamentally the same as mentioned previously with the exception that the top portion may be indented to support bending over the ballast piece. Referring to FIG. 3B a stacked illustration of the components are illustrated. A ballast piece 320 with a hole 321 in it lies above a frictional support pad 322 also with a hole in it. An array-stay can have the components stacked up the stay before the top portion of the array stay is folded over the ballast piece. In FIG. 3C, the array stay is illustrated with the top portion bent over 340.

Figure 4:
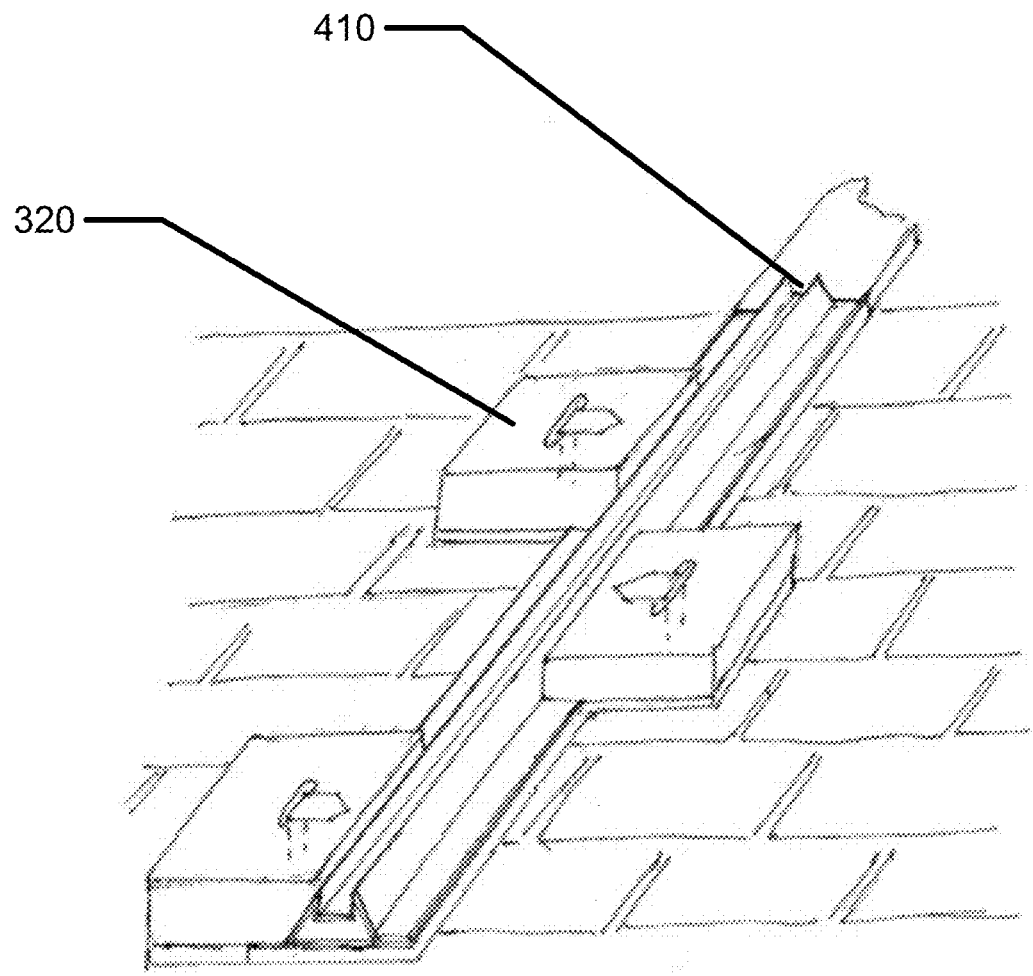
FIG. 4 illustrates a support channel with block form ballast and array-stays.

Continuing to FIG. 4, a ballast array-stay system is illustrated. The ballast pieces may be affixed to an array stay in a position that allows a ballast piece to overlap a support bracket 410.

Figure 5A:
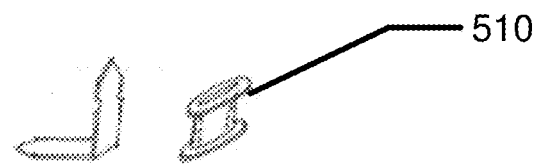
FIGS. 5A and 5B illustrate a panel supported by block form stays with modified angle array-stay.
Figure 5B:
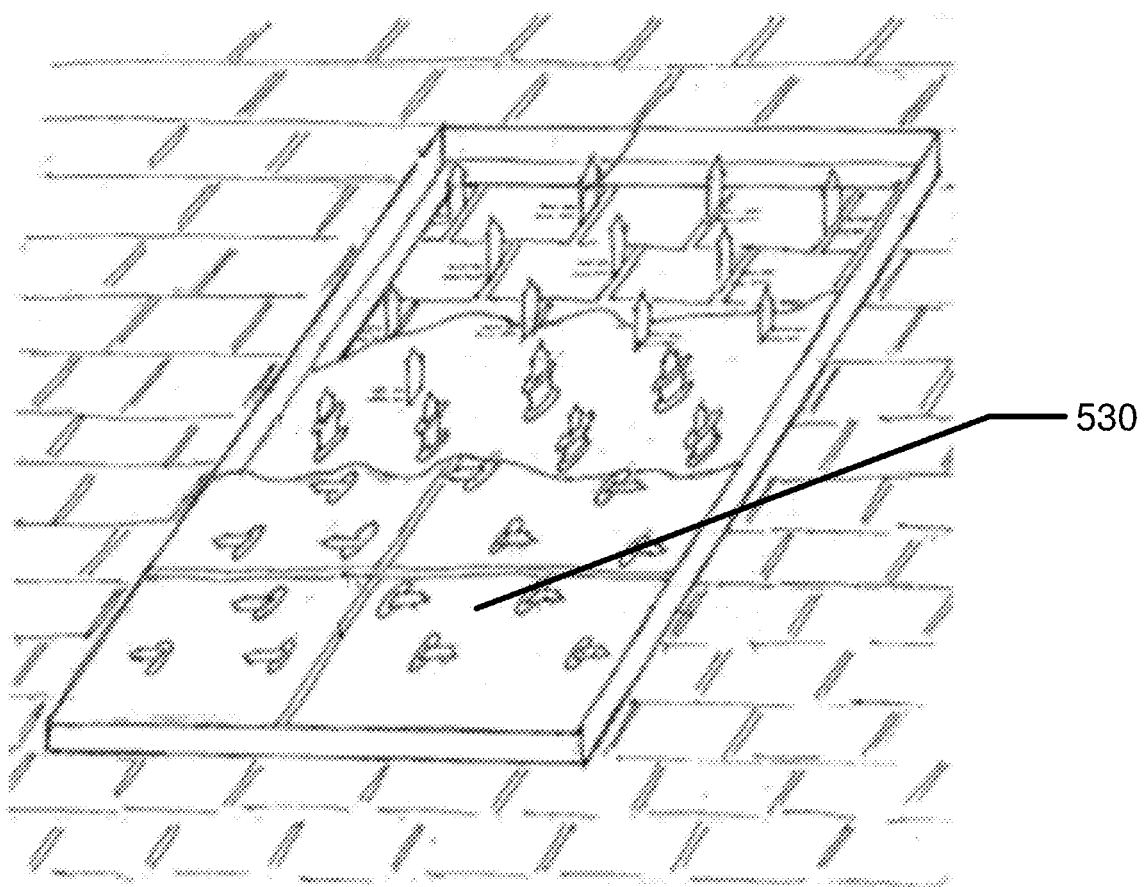

Referring to FIG. 5A a component related to ballast systems is illustrated. In some examples, a sleeve 510 may be utilized to insulate a stay from a ballast. In another aspect the sleeve 510 may be used protect a ballast material and array stay from abrasion with each other. As illustrated in FIG. 5B, large ballast pieces 530 may be laid out within a frame on a roof with a support frame held in place with the ballast supported array stay components. A resulting supported frame may be used to support roof located components like solar panels.

Although the drawings generally illustrate rectangular and/or linear shapes of devices, it is noted that devices with circular, arcuate and irregular shapes may also be affixed to a roof with the current systems. In addition, solar shingles may be attached to a roof with existing shingles already intact without violating the integrity of the existing surface.

Array-Stay Support Systems with Spiral Stay Designs

Figure 6A:
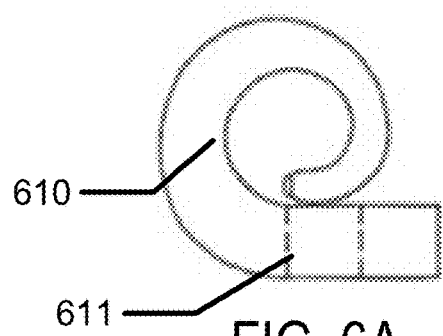
FIGS. 6A-6D illustrate attachment aspects for exemplary spiral type stays.
Figure 6B:
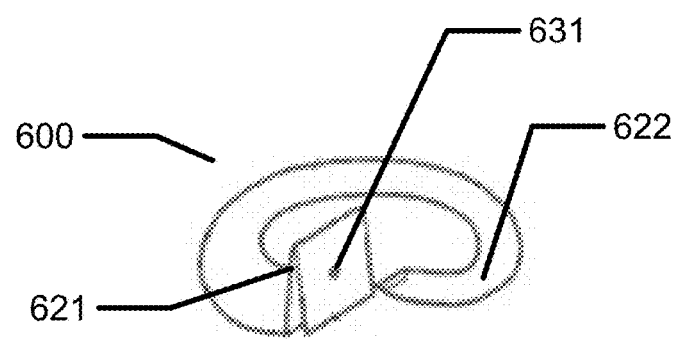

Referring to FIGS. 6A-6D, aspects of array-stay split-beam anchoring systems using a spiral stay 600 are seen. As illustrated in FIG. 6A a spirally cut piece of sheet metal 610 may have folding points 611. When the sheet metal is folded on the folding points 611 an array stay piece as illustrated in FIG. 6B may be formed. The spiral array-stay may be another type of anchoring device which may be used with asphalt roof shingles while not penetrating them or the underlying roof with anchoring hardware.

Referring to FIG. 6B, the spiral stay 620 is a thin, stiff, metal device with a square vertical leg that may be doubled over for added strength and a circular spiral lateral leg that may extend from the vertical leg in almost a full circle or spiral. The spiral-stay 620 may be made of one piece and bent in two places to create the vertical 621 and lateral 622 legs. The vertical leg of the stay may have a pilot hole 631 to aid in screw attaching the split beam halves to the spiral stay upright leg 621. The spiral leg 622 may be inserted under a shingle tab from the side of the shingle tab and the whole device may be turned using the upright leg further and further under the shingle until it makes a full circle.

Figure 6C:
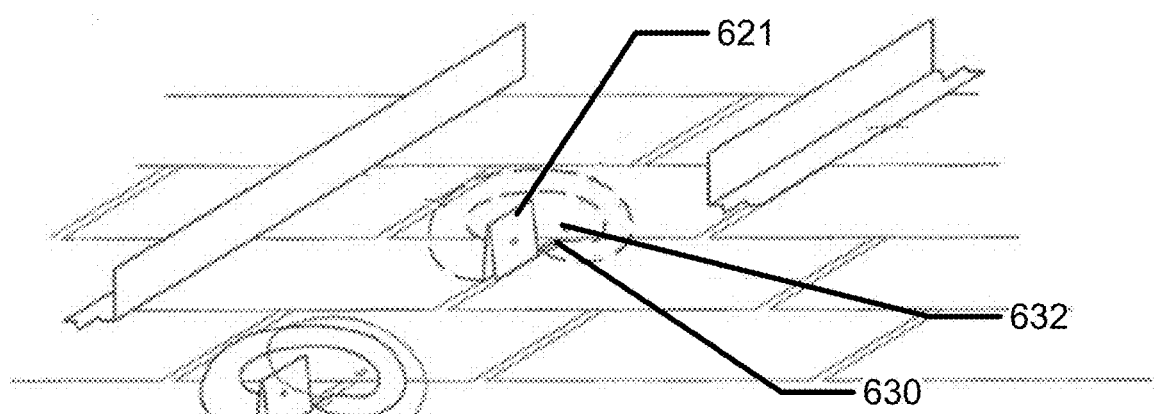

Referring to FIG. 6C, the dotted lines of item 630 illustrate how a spiral shaped piece may be rotated underneath the ceiling shingle. When installed by rotating the stay under the shingle, only the upright leg 621 may be showing, emerging from between two adjacent roofing shingles. As shown in FIG. 6C, in some examples, when that the stay is rotated it may surround a nailed region 631 of an adjacent roofing shingle; thereby, adding some additional holding force.

Figure 6D:
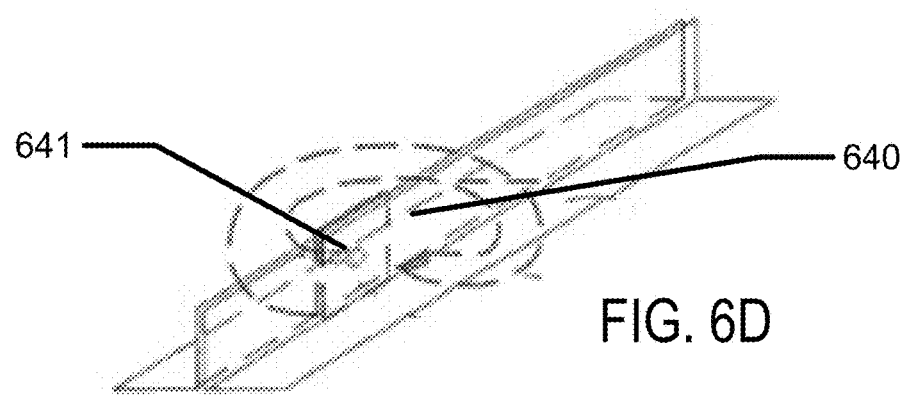

Referring to FIG. 6D, the spiral array stay is illustrated aligned with a support leg 640 which also may have pre-drilled holes as mentioned with respect to earlier figures. The pre-drilled holes may be used to fasten the array stay to the support leg 640. The support leg may form part of the roofing support structure which may support a roof mounted solar panel system for example.

Removal of Array-Stay Systems

The above mentioned examples depict two basic exemplary types of array stay components. Each of the types, the straight leg array stay and the spiral shaped array stay may be used to fasten a roof support system in place in a manner that is not relatively permanent as would be the case for supports that are bolted or nailed in place. This may mean that removal of a roof support system and what it is supporting may be relatively straight forward. And, there may be relatively little if any roofing damage that may need to be repaired after the aforementioned removal. To remove a straight leg array stay after all supported structure and supports are disconnected from the array stays, a worker may withdraw the array stay from its position under the roofing shingle by pulling it out, or by gently lifting the roofing shingle before pulling out the array stay.

To remove the spiral-shaped stay during disassembly, the turning procedure may be reversed after removing the split-beam halves until the entire device is cut from under the shingles. Since the spiral stay must be strong as well as thin to fit under the shingles, in some examples a stainless steel may be a good material for this application. In some other examples other metals like aluminum or strong plastic materials or composite materials such as carbon fiber epoxy material may be used. For different types of materials the spiral-shaped stay may be painted or anodized to provide greater weather resistance, as well as to enhance its appearance. A specific color, such as blue-gray, might be selected in a standard or customized color. In some examples, a soap gel or liquid may be used as a lubricant to aid in inserting the spiral leg under the shingles, which may be washed away thoroughly after insertion to establish a frictional fit. In some examples, the tip or end of the spiral leg or the straight leg may be folded over to lessen the sharpness of the tip for easier insertion under the shingles.

Under Soffit Support Structures

Figure 7:
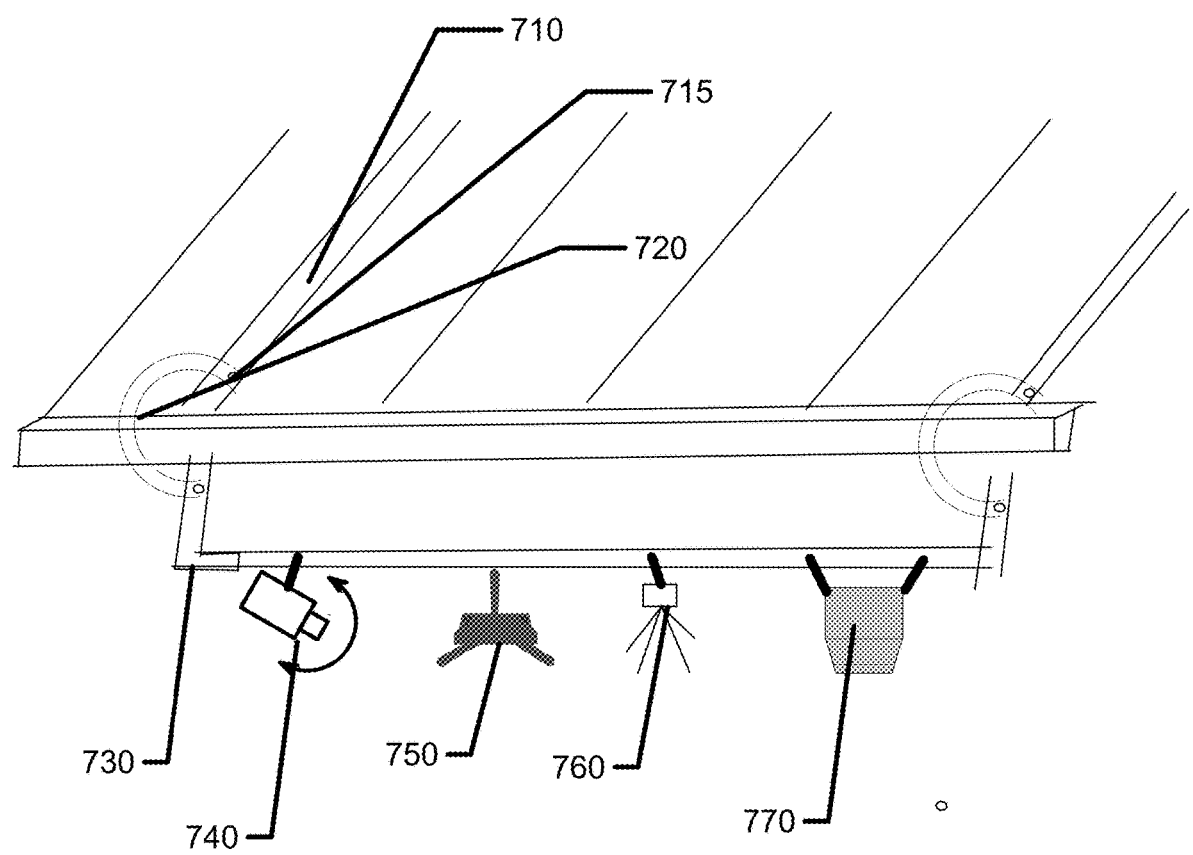
FIG. 7 illustrates an exemplary under soffit support system that may be used in conjunction with an attached roof top array-stay split-beam system.

Referring to FIG. 7, the roof mounted support structure may be made to extend under the soffits on either or both sides of the roof. In some examples, such an extension under the soffits may allow for the system to be more rigidly held to the houses main structure as support beams wrap around gutters and eaves and under soffits of roofs. Various points from the peak of the roof, through structures along the roof top and to systems under the roof edge and soffit may have adjustment aspects that allow for tensioning of the various components amongst themselves to afford a structure that sits as planar and straight as possible to the roof surface and the lines of the asphalt shingles. In conditions of wind and other conditions that may exert stress upon the support system, a properly tensioned roof support system may increase the capabilities of the system as a whole. The structure that results under the soffits may have additional utility in some examples.

There may be numerous useful items that are typically affixed to a house's frame for external mounting under or near a soffit that may be mounted instead to the under roof structure of the array-stay support system. In FIG. 7, an array-stay held support 710 may connect at connector 715 to a support member which wraps around the edge of the roof and associated components such as gutter systems. The wrap around support member 720 may then be attached to a vertical support rail 730, which may connect to numerous wrap around supports to allow it to support weighted objects under the soffit. In some examples, security cameras 740, exterior lighting systems 750, motion detectors 760, and external speakers or sound systems 770 may be mounted. There may be numerous other types of systems that may also be mounted on the under soffit support system.

To install the various components of the array stay system including array stays, non-slip retainer, split beams, and various attachment components, there may be components such as vertical roof tension support beams of designated sizes which may be laid on the roof by workers. A roof peak tensioner device may then be utilized. The various components may be initially connected loosely, with no applied tension. A worker may then connect the fascia/gutter bridge while the components are still loosely connected, and then proceed to attach the soffit under-mount hardware. In some examples, there may be no components supported under the soffit. With these necessary components connected, and optional components connected, as desired, workers may proceed to adjust the tension, up or down as needed, to begin the process of tightening the precision brackets. The adjustment process may be repeated numerous times to balance the roofing structure in as ideal a condition as possible. As well, to maintain full connection to the opposing side soffit, fascia or gutter of the home or office, the structure may be thought of as a single system with numerous components that interact with each other and must be balanced between them. An optional terminator bar may have similar background tension devices. The horizontal module rack may be mostly made up of standard size pieces that are specially engineered to fit the vertical beams of an array-stay system. After the vertical tension and adjustment is finalized, workers may install a roof peak dust/ice cover. Depending on the use of the array stay structure, workers may install solar modules, flood lights, motion detection devices, cameras, or other related security hardware along with custom structures to route power connections, and video/audio/motion cabling or fiber optic around the various structures.

Glossary

Array-Stay: as used herein "array-stay" or "array stay" means a component comprising a vertical member and a lateral member, wherein the vertical member may fit in a seam between as installed roofing shingles. When the "array-stay" is in a mounted position at least a portion of the lateral member is positioned between a roofing shingle and any underlying roofing shingles as well as the roof. The array-stay may have surface texture or other modifications to increase friction between its lateral member and the overlying roofing shingle.

While the disclosure has been described in conjunction with specific examples, it is evident that many alternatives, modifications and variations will be apparent to those skilled in the art in light of the foregoing description. Accordingly, this description is intended to embrace all such alternatives, modifications and variations as fall within its spirit and scope.

What is claimed is:

1. A method for attaching a removable roofing system, the method comprising:
    placing a first array-stay underneath a first installed roofing shingle on a roof and a second array-stay underneath a second installed roofing shingle that is next to the first installed roofing shingle,
    wherein the first and second array-stay each comprise a lateral member and a vertical member, wherein the lateral members of the first array-stay and the second array-stay are underneath the first roofing shingle and the second roofing shingle, respectively, and the vertical members of the first array-stay and the second array-stay are touching and each protrude from a seam between the first roofing shingle and the second roofing shingle;
    placing a third array-stay underneath a third installed roofing shingle on the roof and a fourth array-stay underneath a fourth installed roofing shingle that is next to the third installed roofing shingle,
    wherein the third and fourth array-stay each comprise a lateral member and a vertical member, wherein the lateral members of the third array-stay and the fourth array-stay are underneath the third roofing shingle and the fourth roofing shingle, respectively, and the vertical members of the third array-stay and the fourth array-stay are touching and each protrude from a seam between the third roofing shingle and the fourth roofing shingle;
    placing a first half split-beam next to the first array-stay and the third array-stay;
    placing a second half split-beam upon the roof parallel with the first half split-beam and next to the second array-stay and the fourth array-stay; and
    fastening the first half split-beam to the first array-stay, the second array-stay, and the second half split-beam; and fastening the first half-split-beam to the third array-stay, the fourth array-stay, and the second half split beam.

2. The method of claim 1, further comprising attaching a solar panel to the roofing system.

3. The method of claim 2, further comprising removing the solar panel from the roofing system.

4. The method of claim 3, further comprising removing the roofing system from the roof.

5. The method of claim 4, wherein after removing the roofing system, the roof does not have any penetrations from attaching the roofing system to the roof.

6. The method of claim 1, further comprising attaching a high friction foam polymer padding to at least one of the first half split-beam and the second half split-beam.

7. The method of claim 1, further comprising attaching slotted rail attachment clip to at least the first half split-beam, attaching a support member to the slotted rail attachment clip, and attaching a solar panel to the support member.

8. The method of claim 7, further comprising attaching an under soffit support system to the support member.

9. The method of claim 8, further comprising attaching a security camera to the under soffit support system.

10. The method of claim 8, further comprising attaching a motion detector to the under soffit support system.

11. The method of claim 8, further comprising attaching an external lighting system to the under soffit support system.

12. The method of claim 8, further comprising attaching an external speaker system to the under soffit support system.

13. The method of claim 8, further comprising attaching a high friction foam polymer padding to at least one of the first half split-beam and the second half split-beam.

14. The method of claim 8, further comprising:
    removing the under soffit support system; and
    removing the solar panel.

15. The method of claim 14, further comprising removing the roofing system.

16. The method of claim 15, wherein after removing the roofing system, the roof under the roofing system does not have any penetrations from the attaching the roofing system.

17. A method for reversibly attaching items to a roofing system, the method comprising:
    placing a first array-stay underneath a first installed roofing shingle on a roof and a second array-stay underneath a second installed roofing shingle that is next to the first installed roofing shingle,
    wherein the first and second array-stay each comprise a lateral member and a vertical member, wherein the lateral members of the first array-stay and the second array-stay are underneath the first roofing shingle and the second roofing shingle, respectively, and the vertical members of the first array-stay and the second array-stay are touching and each protrude from a seam between the first roofing shingle and the second roofing shingle;
    placing a third array-stay underneath a third installed roofing shingle on the roof, and a fourth array-stay underneath a fourth installed roofing shingle that is next to the third installed roofing shingle,
    wherein the third and fourth array-stay each comprise a lateral member and a vertical member, wherein the lateral members of the third array-stay and the fourth array-stay are underneath the third roofing shingle and the fourth roofing shingle, respectively, and the vertical members of the third array-stay and the fourth array-stay are touching and each protrude from a seam between the third roofing shingle and the fourth roofing shingle;
    placing a first half split-beam next to the first array-stay and the third array-stay;
    placing a second half split-beam upon the roof parallel with the first half split-beam and next to the second array-stay and the fourth array-stay; and
    fastening the first half split-beam to the first array-stay, the second array-stay, and the second half split-beam; and fastening the first half-split-beam to the third array-stay, the fourth array-stay, and the second half split beam;
    attaching a slotted-rail attachment clip to at least the first half split-beam;
    attaching a support member to the slotted-rail attachment clip;
    attaching a solar panel to the support member,
    attaching a high friction foam polymer padding to at least one of the first half split-beam and the second half split-beam;

attaching an under-soffit support system to the support member, and attaching a security camera to the under-soffit support system.

18. The method of claim 17, further comprising:

removing the security camera from the under-soffit support system;

removing the under-soffit support system;

removing the solar panel;

removing the high friction foam polymer padding;

removing the roofing system; and wherein after removing the roofing system, the roof under the roofing system does not have any penetrations from attaching items the roofing system to the roof.

* * * * *